United States Patent Office 3,212,127
Patented Oct. 19, 1965

3,212,127
AUTOMATIC CONTROL APPARATUS FOR MAINTAINING TRANSVERSE THICKNESS UNIFORMITY OF EXTRUDED MATERIAL
William M. Flook, Jr., Greenville, Del., and Charles B. Moore, Ward, Pa., assignors to E. I. du Pont de Nemours and Company, Wilmington, Del., a corporation of Delaware
Filed Jan. 23, 1963, Ser. No. 253,486
2 Claims. (Cl. 18—2)

This invention relates to apparatus functioning in a closed loop for automatically minimizing the deviation of individual variables from the average value of all variables of a related group. It is particularly related to apparatus for maintaining the transverse thickness uniformity of extruded organic thermoplastic film during production, wherein the thickness of each of a plurality of longitudinal lanes may be adjusted to conform to the average thickness of all lanes across the film.

The advantages of automatic control means over manual control means to produce more uniform products are well known, and automatic devices are meeting with increased acceptance. For many processes, essentially packaged control apparatus is available and is capable of performing quite satisfactorily. Uniformity requirements vary among various products of a general class such as films, however, and no single unit, even after extensive modification, is suitable for all purposes. For example, in polyester films it is highly desirable to maintain edge-to-edge flatness more rigorously than for some other films. Variations in the transverse thickness result in poor roll formation, which is especially harmful in some applications of polyester film. Tapes slit from this film are widely used as a base for magnetic recording, especially in the high speed computer applications, where precise handling is important. Poor roll formation causes interference of the reel flanges with the free operation of the tape.

The overall sheet average thickness, which is determined by the throughput of a constant-volume feed pump for the extrudate, varies slowly and can be effectively controlled manually or by relatively simple devices which are of a common type. The control of flatness, however, is more complex as a result of short-term variations in thickness which can induce the control apparatus to exaggerate these variations and often to fail in accomplishing the intended purpose.

The failure due to short-term variation is inherent in the design of most automatic control apparatus in general use. One such apparatus is shown in U.S. Patent No. 3,000,438. This apparatus is characterized by an immediate response by thickness adjustment apparatus to a deviation from a preselected value sensed by thickness-sensing apparatus. However, in using such apparatus a short-term variation tends to cause a false correction which may persist for an extended time until the thickness-sensing element in its traversing scan senses it and makes the appropriate adjustment.

The apparatus of the present invention avoids the adverse effect of short-term variations and false corrections and provides a means for controlling the edge-to-edge flatness of thermoplastic films in productions. This apparatus maintains edge-to-edge flatness of a product by adjusting the thickness of each of a plurality of parallel lanes to the overall sheet average thickness. The foregoing is accomplished by an automatic control apparatus comprising property-sensing means adapted to scan the web transversely, means for accumulating the average magnitude of the web property, a plurality of means for continually accumulating the magnitude of the property at a plurality of corresponding controller lanes, means for computation of the deviation of separate controller lanes from the average magnitude of the property of the web, means to actuate controller means for each controller lane whereby the deviation of the magnitude of the property of each controller lane from the average web property magnitude is minimized. The controller means or adjustment means are conventional. Suitable means for controlling the thickness of an extruded sheet are shown in U.S. Patents 2,387,718 and 2,727,276, whose disclosures are incorporated herein by reference.

Basically, the present invention interposes a computer between the transverse scanning thickness-sensing element and a plurality of parallel thickness-adjusting elements to compute the deviation of the thickness of each of a plurality of parallel longitudinal lanes from the average thickness of all lanes of a film in production and to control corrective adjustments. The computer, which has data storage capacity, stores and computes the deviation after a number of scans before adjustment, thus minimizing the effect of short-term variations. The computer is characterized by economy of construction as a result of each of the basic computer elements serving a triple function. Each element, a binary counter, serves: (1) to store primary data; (2) to compute the deviation, and to store the magnitude and sign of deviation data; and (3) to direct control of the direction and extent of operation of adjuster motors.

Specifically, the invention involves (1) a traversing thickness-sensing element which scans the web and produces an analog signal output representative of the transverse profile of the web, (2) an encoder which converts the analog signal output to a corresponding digital signal, (3) lane selection apparatus which identifies and stores the digital signal representative of the thickness in a plurality of lane storage elements which correspond to longitudinal lanes on the film and (4) a computer which determines the deviation of the thickness of the respective lanes from the sheet average. The deviation signal of each lane, which is stored in binary form, controls the operation of the appropriate one of a plurality of hopper lip adjuster motors which are driven in accordance with the deviation signal to minimize the thickness deviation of the respective lanes by opening or closing the lip at appropriate points across the hopper corresponding to the lanes. After completion of the sequence of steps in this measurement and adjustment, it is interrupted for a period at least adequate to allow the web extrudate from the adjusted hopper lips to reach the thickness-sensing elements. Thereafter, the sequence is repeated continually, with the inclusion of the delay in each sequence.

The details of the invention will be more clearly understood by reference to the drawing, in which.

Figure 1:
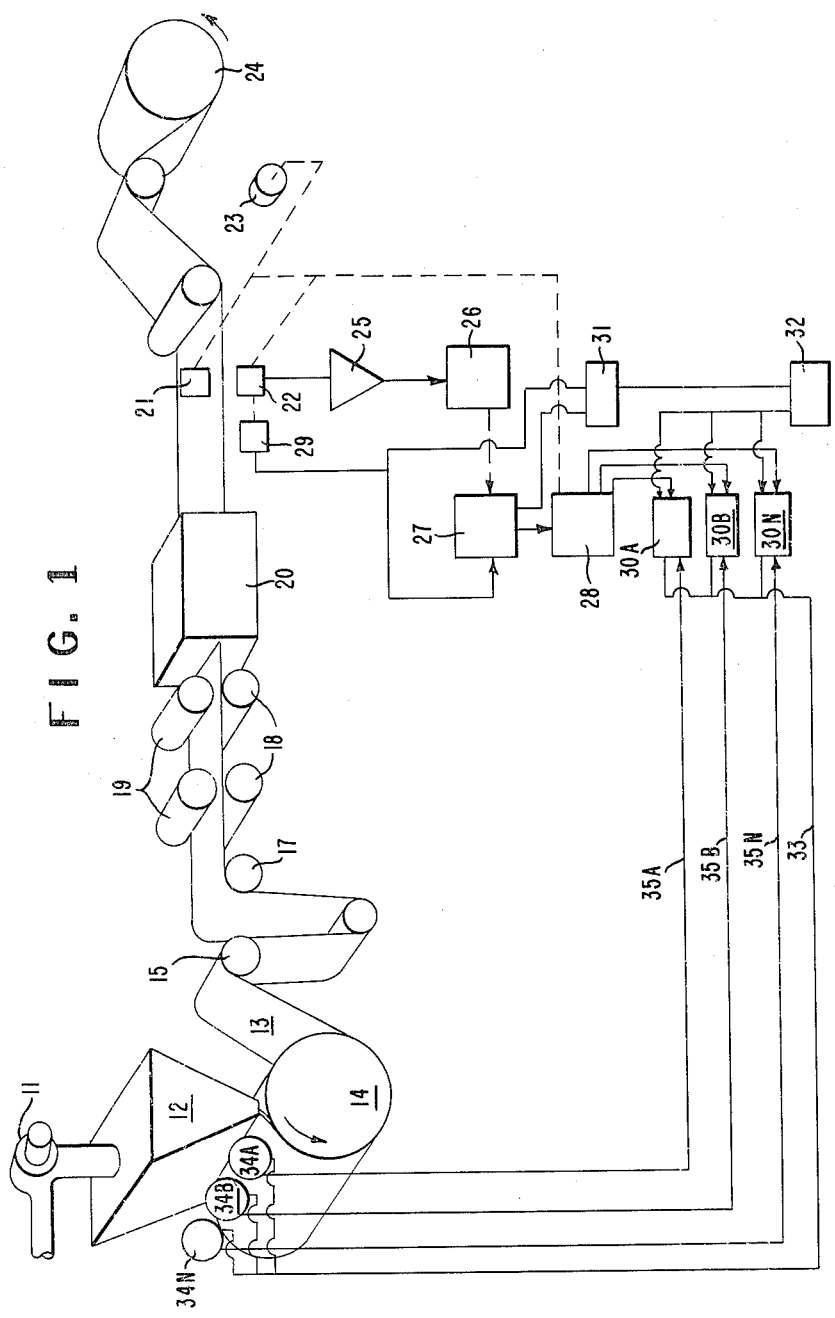
FIGURE 1 is a block diagram illustrating the functional relationship of the basic elements of this invention.

FIGURE 1 illustrates the functional relationship of the elements of this invention adapted to apparatus for the production of a thermoplastic film. Referring to the figure, constant volume pump 11 supplies the fluid polymer to casting hopper 12. From hopper 12 the polymer is cast as web 13 onto quench drum 14. Web 13 passes to rollers 15, 16, 17, 18 and 19, which may be idler or nip rolls as are commonly used for application of longitudinal direction stretch, and thence to tenter oven 20 where it is subjected to transverse stretch and is heat-set for dimensional stability. Thence web 13 travels to windup roll 24. It is to be understood that the present invention is not limited to a particular sequence of stretching and that the present description of the manufacturing steps is only for illustration.

Continuing in reference to FIGURE 1, web 13 after passage from tenter oven 20 has the profile of the finished film which is quite different from the profile of the cast web. In the preferred usage of this invention, deviations are sensed at this point. Accordingly, ultraviolet light source 21 provides an incident beam to pass through the web to receiver 22. The wavelength of the ultraviolet light is selected so that the degree of attenuation of the beam passing through the web is a function of the thickness of the web according to Beer's law. The output signal of receiver 22, therefore, is an analog signal with a magnitude varying inversely as the thickness. Ultraviolet source 21 and receiver 22 are caused to cyclically scan transversely adjacent opposite surfaces of the web by motor 23. The analog output of receiver 22 is coupled through amplifier 25 to the input of strip-chart recorder 26 in such manner that the angle of rotation of the pen motor is a function of the analog thickness signal, to produce a continuous strip-chart record of thickness variations. The shaft of the pen motor is mechanically coupled to encoder 27, which is an analog-to-digital converter. This encoder converts the thickness analog signal to a digital signal in the form of a train of pulses in which the number of pulses is a function of the momentary value of the analog signal. As thickness-sensing receiver 22 traverses the web in its scan, synchronizing switches 28, which are operated by a mechanical connection from scanning drive motor 23, direct the digital thickness measurements into the proper one of a plurality of separate binary storage circuits of computer 30A, 30B, . . . 30N. Each of the storage circuits, a type of storage of binary digitized information, corresponds to a separate longitudinal lane on the web. Also the digital thickness measurement is simultaneously directed to a storage and computation circuit where a running sheet average is computed. Scanning control 29 which is located at one end of the scan of the thickness-sensing elements, source 21 and receiver 22, is provided with a switch which provides pulses at the end of each complete scan. By counting these pulses the computer keeps track of the number of scans that have been completed. Also associated with this circuit is a selector so that the number of scans, for example 2, 4, 8 or 16 before computation can be preset by the operator.

Continuing in reference to FIG. 1, when the last scan of the pre-selected series is completed, individual elements of computer (30A, 30B, . . . 30N) compute the deviation of each lane from the overall sheet average, erase the lane thickness measurements and store the magnitude and the deviation in the corresponding lane storage circuit. Each of the storage circuits or cards contains ten binary counting circuits, which serve a storage and counting function with a capacity of $$2^{10}=1024$$

The analog signal causes angular displacement of the pen-drive motor in accordance with the magnitude of the thickness. The shaft of the motor is coupled to encoder 27, a rotary analog-to-digital converter. This encoder with the aid of pulse-shaping and gating circuits, produces trains of pulses with the number of pulses proportional to the analog thickness signal which controls the angular displacement of the recorder pen drive shaft. Other gating circuits coupled to the indexer 28 determine when a train of pulses from the encoder will be accepted by the computer, and to which lane computer card (30A, 30B, . . . 30N) it will be routed. When the gaging device (21 and 22) reaches one of the longitudinal lanes at which a pair of contacts in the indexer closes, the gating circuits allow a single train of pulses from the encoder 27 to enter the appropriate lane computer card.

The number of pulses is proportional to the momentary value of the analog thickness signal. Encoder 27 is provided with a 40 kilocycle alternating current input, which is chopped into the appropriate pulse lengths in the encoder, and subsequently rectified, amplified, and shaped to produce square wave D.C. pulses as required by the lane computer cards.

The train of pulses is directed to the individual members of a number of storage elements or cards corresponding to the preselected lanes in the film. The pulses enter the cards, 30A, 30B, . . . 30N each of which has ten binary counters ($2^{10}=1024$), until the entire count representing thickness has been stored. If the count is greater than the maximum capacity of the card (1024) an eleventh counter in each card records that the card has been filled, and the counts continue to be received and stored in the card. The state of the eleventh counter indicates an overflow condition by an appropriate switching in subsequent computation.

While the digitized thickness signals are being directed to each of the appropriate lane cards, card 31, as mentioned hereinbefore, computes a running sheet average by means of flip-flop counters similar to those employed for individual lane thickness data, except that two counters are used. The first counter is preset to the value of the divisor; for example, if thirty-five lanes are used, the divisor will be thirty-five. This counter produces one output pulse for every thirty-five input pulses. The second counter located in card 31 adds the output pulses from the first counter, thus accumulating a sheet average. A scan-actuated counter 29 has a capacity of four bits ($2^4=16$) and carries the divisor from the number of scans. For example, if sixteen scans are preselected, the number of scans from which the counts are transmitted to the storage cards is reduced to $\frac{1}{16}$, and if eight are selected, then $\frac{1}{8}$, and so on to the preferred minimum of two scans. This phase of the computation is controlled by the scan preselector control which feeds in pulses representative of the difference of the number of scans and sixteen to this counter. After scanning is complete, each lane register contains the average lane thickness ($N_L$) and the sheet register contains the overall sheet average ($N_s$). Since the bit capacity of all of the registers is the same, it is possible to generate a pulse train proportional to the difference between the sheet average and the number corresponding to full capacity (i.e., $2^{10}=1024$) by a clock 32 which is turned on by the scan-stop relay. This clock, a pulse-generating oscillator, pulses at the rate of 1000 pulses per second, and produces just enough pulses to fill the sheet average counter. This, therefore, produces N pulses where $$N=1024-N_s$$

These N pulses are simultaneously counted by each lane register, starting from the lane average, $N_L$, already stored. Therefore, $N'_d$, the count which is finally stored in the lane register is $$N'_d=N_L+N$$

or $$N'_d=N_L+1024-N_s$$

Since the actual deviation $N_d=N_L-N_s$, then the stored count is $$N'_d=1024+N_d$$

If the lane average $N_L$ is less than the sheet average $N_s$, the computed deviation $N'_d$ is less than 1024 and represents the complement of the actual deviation $N_d$ (i.e. $1024-N_d$). If the $N_L$ is greater than $N_s$, the deviation $N'_d$ is greater than 1024. In this case, the lane counter overruns and starts counting up from zero. When the counter overruns, it generates a carry pulse which triggers the sign cell (part of the eleventh counter) signifying that the lane average $N_L$ is greater than the sheet average $N_s$. The number $N'_d$ computed and stored in this case is the actual deviation $N_d$. The extent of operation of the individual hopper adjuster motors is controlled by a feedback signal from the individual hopper motors to the corresponding lane storage card. In order for the feedback step to operate properly, it is necessary for the counters to store the complement of the deviation in all cases. Consequently, when the lane average $N_L$ is greater than the sheet average and the counter overruns, the subsequent value for $N_d$ must be complemented to produce $$N'_d = 1024 + N_d$$

Complementing of the cards where $N_L = N_s$ is accomplished by a single negative pulse sent out by the clock as it is switched off by the $N_s$ count. All of the cards which were overfilled by the count are armed by the eleventh counter to receive this pulse. This pulse, being of the opposite polarity to the count pulses is coupled to all of the counters in each card by diodes, so that this pulse reverses the state of all binary cells of these particular cards. Thus, all cards are converted to counts which are the complements of the deviation and are in a state to receive the feedback pulses.

After completion of the computation, the stop switch on the clock turns on the power to all hopper adjuster motors 34A, 34B, . . . 34N simultaneously through conductor 33. The direction of operation of the individual motors is determined by the sign cell on each computer, which, as hereinbefore described, actuates a relay to control the motor direction if the pulses supplied by the clock overfill the card (e.g. $N'_d$ 1024). The shaft of each of the hopper adjuster motors 34A, 34B, . . . 34N is equipped with an electric pulser which sends out a train of pulses corresponding to the extent of rotation. The number of pulses per revolution of the motor shaft is selected, by means known to one skilled in the art, on the basis of the gearing of the motor to the hopper bolt, the pitch of the thread of the hopper bolt and the thickness shrinkage of the web from the extrusion hopper to the thickness-sensing element (ultraviolet light source 21 and receiver 22). The rotation pulses $N_F$ are fed back through individual channels 35A, 35B, . . . 35N to the corresponding computer elements (30A, 30B, . . . 30N) which were storing the complemented deviation $N'_d$. The lane reading N then becomes $$N = N'_d + N_F$$

When the number of feedback pulses ($N_F$) is equal to one less than the actual deviation ($N_d - 1$) the counter is full and $$N = 1024 - 1 = 1023$$

The next feedback pulse causes the counter to overrun. A pulse is then generated which de-energizes the bolt motor. If the motor coasts, the counter continues storing from zero, thus storing the motor overrun. Since some motors were increasing the lane thickness and some decreasing the lane thicknes, the overrun must be subtracted in one case and added in the other. This is accomplished by complementing only those in which the original deviation was negative as described hereinbefore.

Figure 2:
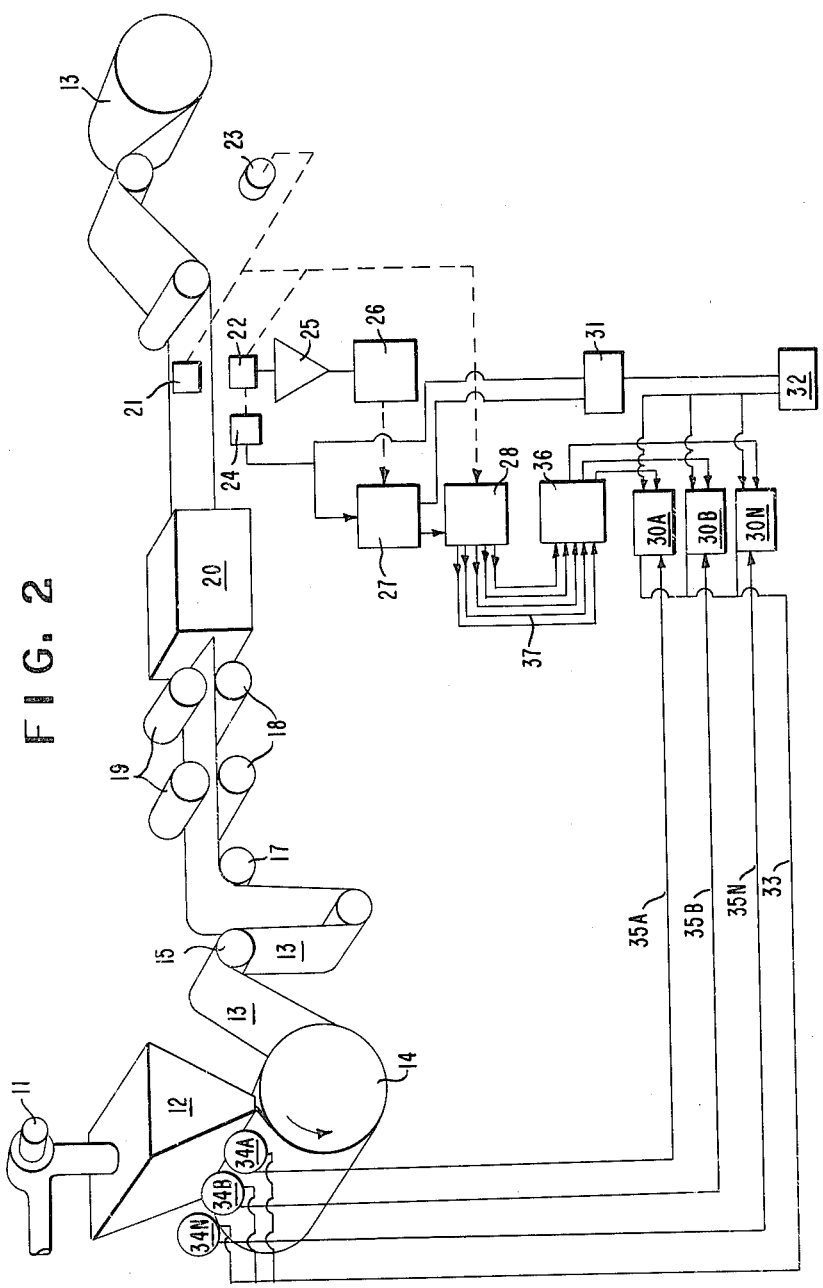
FIGURE 2 is a block diagram illusrtating another embodiment of this invention.
Figure 3:
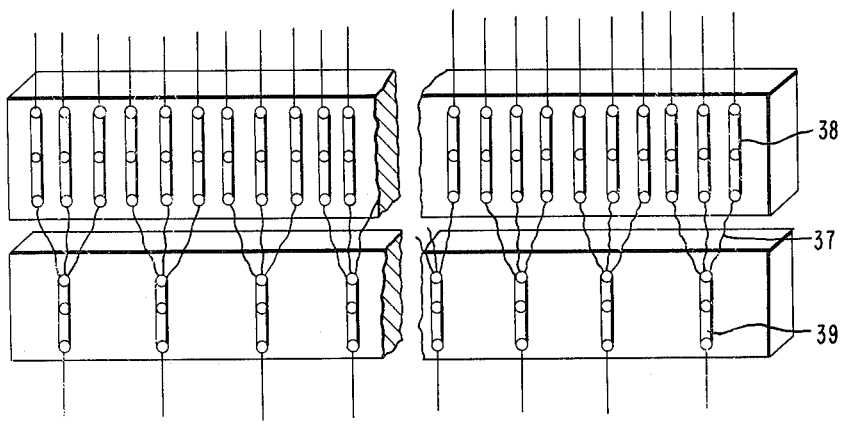
FIGURE 3 is a schematic diagram of an element of this invention.

In a preferred embodiment of this apparatus, as illustrated in FIGURE 2, program board 36 is interposed between indexer 28, which is a lane selector switch, and computer cards 30A, 30B, . . . 30N. This board, illustrated in more detail in FIGURE 3, has patch cords which couple a plurality of (e.g. 120) of receptacles 38 to a smaller number (e.g. thirty-five) of receptacles 39, which are in turn coupled to lane storage cards 30A, 30B . . . 30N. Receptacles 38 are coupled to a plurality of poles on multiple-pole rotary selector switch 28. The stator poles of the rotary switch are so arranged that contact with a stator pole and the rotatable armature, is broken before the next one is made. The program board enables the use of a patching arrangement for the selection of the appropriate longitudinal lane in the final sheet for controlling the individual hopper adjusters.

The selector switch of the indexer utilized in the control apparatus of this invention comprises a permanent magnet attached to a rotary arm driven by mechanical couplings to the scanning mechanism. Switches, activated by the proximity of a magnet are positioned in a stator in a position to be operated at an instant appropriate to the location of the scanning head. An alternate arrangement of the selector switch embodies the positioning of the magnetically operated switches along the path of the scanning head so that the circuit to the appropriate storage card is closed by the traverse of the scanning head.

While the disclosure of the present control apparatus has been limited to show its adaptation to the production of a thermoplastic web, it is equally adaptable to the production of other webs, such as regenerated cellulose webs, to the production of continuous mats of non-woven fabrics, having multi-head laydown of fibers, and to the continuous production of sheets, in general. In any process in which a product stream is distributed among a number of parallel paths, this apparatus is useful in maintaining a preselected distribution among the various paths.

The disclosure in the production of the thermoplastic material includes the use of an extrusion lip which has an orifice which may be varied at points across the lip by means of motor-driven adjusting screws. However, this apparatus, with modifications known to one skilled in the art, may be used with a plurality of individually operated web heaters to control gauge by heating thicker lanes before or during stretching.

Furthermore, while the disclosure has been directed to the use of flip-flop binary counters, magnetic core or other magnetic devices for data storage are operable with this control apparatus.

The control apparatus of this invention has many advantages over prior art apparatus. First, as mentioned previously, the storage capacity and the use of an extended average deviation minimizes the effect of short-term deviations which have an upsetting effect on control caused by what amounts to false corrections. Second, the use of the running sheet average as a target for thickness, or other dimension, enables the attainment of a more uniform sheet than with controllers which utilize a preselected, set-point target. The overall sheet average is controlled by material throughput, which is determined by pressure, viscosity, etc., and not by the relative opening of across a hopper lip. Accordingly, those automatic control devices which strive for a set-point target when throughput is out of control do so at the cost of edge-to-edge thickness.

Having fully disclosed the invention, what is claimed is:

1. In an apparatus for extruding a web of material composed of a hopper adapted to contain said material for said web, extrusion means composed of orifice-defining lips disposed in integral relationship with said hopper adapted to extrude said material in the form of a web; a pump adapted to force said material through said lips of said extrusion means; adjustment means disposed at said extrusion position of said hopper adapted to adjust the thickness of said web at a plurality of locations across the width of said web; and wind-up means disposed distant from said extrusion means adapted to collect said web, the improvement wherein an automatic gauge control system is provided comprising means for transversely scanning the moving web, the scanning means disposed between said extrusion means and said wind-up means adapted to provide an output that is directly related to the web thickness at any particular location across the width of the web; means for computing the average web thickness across the width of the web; means for computing the deviation of the web thickness at any particular location across the width of the web from said average web thickness and for providing a plurality of outputs each directly related to the deviation at a particular location across the width of said web; means adapted to feed said outputs to said adjustment means, which, in turn are adapted to adjust the thickness of said web at said plurality of locations across the width of said web.

2. In an apparatus for extruding a web of material composed of a hopper adapted to contain said material for said web, extrusion means composed of orifice-defining lips disposed in integral relationship with said hopper adapted to extrude said material in the form of a web; a pump adapted to force said material through said lips of said extrusion means; adjustment means disposed at said extrusion position of said hopper adapted to adjust the thickness of said web at a plurality of locations across the width of said web; and wind-up means disposed distant from said extrusion means adapted to collect said web, the improvement wherein an automatic gauge control system is provided comprising means for transversely scanning the moving web, the scanning means disposed between said extrusion means and said wind-up means adapted to provide an output that is directly related to the web thickness at any particular location across the width of the web; means for computing the average web thickness across the width of the web from a plurality of scans of said scanning means; means for computing the deviation of the web thickness at any particular location across the width of the web from said average web thickness and for providing a plurality of outputs each directly related to the deviation at a particular location across the width of said web; means adapted to feed said outputs to said adjustment means, which, in turn are adapted to adjust the thickness of said web at said plurality of locations across the width of said web.

References Cited by the Examiner

UNITED STATES PATENTS

| | | |
|---|---|---|
| 3,000,438 | 9/61 | Alexander. |
| 3,006,225 | 10/61 | Mamas. |
| 3,007,052 | 10/61 | Hickman et al. _____ 250—83.4 |
| 3,015,129 | 1/62 | Hays et al. |
| 3,082,323 | 3/63 | Chope et al. _____ 250—83.4 |

WILLIAM J. STEPHENSON, *Primary Examiner.*